US006581498B2

(12) United States Patent

Beyer

(10) Patent No.: US 6,581,498 B2
(45) Date of Patent: Jun. 24, 2003

(54) DEVICE FOR REMOVING THE FILTER MEDIUM FROM THE SPOOL OF AN OIL FILTER AND METHOD OF USE

(76) Inventor: Donald J. Beyer, 71 Lakeshore Dr., Sterling, MA (US) 01564

(*) Notice: Subject to any disclaimer, the term of this patent is extended or adjusted under 35 U.S.C. 154(b) by 38 days.

(21) Appl. No.: 10/008,321

(22) Filed: Nov. 3, 2001

(65) Prior Publication Data

US 2003/0084760 A1 May 8, 2003

(51) Int. Cl.[7] .............................. B23B 1/00; B23B 3/02
(52) U.S. Cl. .............................................. 82/1.11; 82/46
(58) Field of Search .............................. 82/1.11, 46, 47, 82/112, 113, 128, 154, 158, 173

(56) References Cited

U.S. PATENT DOCUMENTS 3,857,156 A * 12/1974 Clark .......................... 29/417
4,483,222 A * 11/1984 Davis .......................... 82/1.2
5,299,348 A * 4/1994 Slack et al. ................ 29/403.3
6,383,567 B2 * 5/2002 Ager et al. .................. 427/282
6,412,376 B1 * 7/2002 Borgia, Jr. ..................... 82/113

FOREIGN PATENT DOCUMENTS

JP 6-198501 * 7/1994

* cited by examiner

*Primary Examiner*—Henry W. H. Tsai
(74) *Attorney, Agent, or Firm*—Ted Masters

(57) ABSTRACT

A device for removing the filter medium from the spool of an oil filter, includes a spindle assembly having (1) a spindle which is shaped and dimensioned to receive the hole in the first end of the spool, (2) a plurality of bearings, and (3) a cutter. A holder/crank having a rotational rim is attached to the spool of the oil filter and locked in place. The holder/crank and spool are then installed in the spindle assembly so that the spindle engages the hole in the spool and rim engages the plurality of bearings. The holder/crank is then rotated as the cutter is brought to bear against the filter medium so that a circumferential cut is made through the filter medium.

16 Claims, 9 Drawing Sheets

DEVICE FOR REMOVING THE FILTER MEDIUM FROM THE SPOOL OF AN OIL FILTER AND METHOD OF USE

TECHNICAL FIELD

The present invention is generally directed to oil filters, and more particularly to a device for removing the filter medium from the spool of an oil filter for inspection purposes.

BACKGROUND OF THE INVENTION

During a 100 hour or annual inspection on a piston aircraft, one of the accepted practices in the industry is that the oil is changed and the spin on oil filter is replaced. In addition, the old filter canister is cut open and the spool containing the filter medium is inspected for any metal particles which would indicate a potential internal failure of main bearings or other moving parts internal to the engine crankcase.

The most popular brand of aviation oil filter is the Champion® brand. The filter canister is cut open, using one of the many oil filter cutters available on the market today. The spool or core which holds the filter medium is then removed from the canister and inspected for the presence of metal particles. In order to adequately inspect for these metal particles, the paper filter medium must be removed from the spool.

At the present time, the only way to do this is to grab the spool containing the filter medium and using a long thin knife, such as a utility knife, to cut each end of the paper filter medium all of the way around the spool close to where it is glued to the central hub of the metal spool. The filter medium can then be removed from the metal spool and stretched out and inspected for contamination. This is a very difficult task taking into consideration that the spool and filter medium is covered with oil and is very slippery. The knife can easily slip and cut the mechanic. Also, due to its construction, the spool has sharp edges which can injury the mechanic as well.

SUMMARY OF THE INVENTION

The present invention overcomes the aforementioned difficulties associated with removing the filter medium from the spool of an oil filter. The device of the present invention is designed to cut the paper filter element at each end of the metal spool after it is removed from its canister. The filter medium can then be removed from the spool and stretched out for inspection of contamination. This tool will cut the medium on all Champion brand aviation oil filters as well as all Challenger brand aviation oil filters. Until now this task was performed by hand at significant risk to the aircraft mechanic of being cut.

The device of the present invention is intended to be held in a vice, or alternatively, it can be screwed to a workbench. Once the oil filter can is cut open, the filter spool containing the filter medium is removed from the canister. There is a strip (or clip) of metal connecting each end of the paper filter medium together on the spool. The strip is twisted or broken loose with a pair of pliers at each end of the spool to allow a path for the cutter blade to cut the filter medium. The spool is then slipped into a spool holder/crank and a thumbscrew is tightened to lock it in place. This assembly is inserted into a spindle assembly so that three roller bearings contact the outer circumference of the holder/crank. The holder/crank and spool can then be rotated. The other end of the spool has a hole in it, which fits onto an aluminum shaft spindle allowing that end to be stabilized when rotating.

A cutter assembly can be moved left and right along the entire length of the spool on a guide rod. The cutter assembly has a safety cover that is spring loaded to the closed position. When the operator decides to cut the filter medium, the cutter assembly cover is held by the black plastic handgrip and pulled toward the operator exposing the blade. At that time, the blade can be brought down to bear onto the filter medium as the other hand rotates the holder/crank by means of a crank handle. It takes very little time to actually make the cuts. Two cuts are made into the filter medium (one at each end) around its entire circumference. The filter medium is then removed as one complete piece and stretched out on a workbench for examination.

Features:

- The present invention comprises a unique way to hold the oil filter spool.
- The roller bearings provide a way to stabilize the end of the spool that is held by the holder/crank.
- The sliding safety handle reduces any hazard to the operator while working near the tool
- The present invention saves considerable time in the process of removing the filter medium from the spool.
- The present invention is adjustable so as to accept all Champion and Challenger brand aviation oil filters.
- The present invention is precision machined of 6061-T6 aluminum.

Advantages:

- The present invention is unique in that it provides a safe means to hold the oil filter spool for cutting.
- The present invention makes a tough job easier and promotes examining the filter media more closely.
- The present invention reduces the hazard and danger of being cut while cutting the filter medium.
- The present invention saves time. It takes less than a minute to cut the filter medium at both ends of the spool.
- The cutting operation is less tedious to perform.
- The present invention cuts more uniformly and completely without any contamination to the filter medium.

In accordance with a preferred embodiment of the invention, a device for removing the filter medium from the spool of an oil filter, the spool having a first end having a hole and an opposite second end. The device has a spindle assembly having (1) a spindle which is shaped and dimensioned to receive the hole in the first end of the spool, (2) a plurality of bearings, and (3) a cutter. The device further includes a holder/crank which is shaped and dimensioned to receive the second end of the spool. The holder/crank has (1) a retainer for fixedly holding the spool in the holder/crank, a circular rim, and (3) a handle for rotating the holder/crank. The second end of the spool may be connected to the holder/crank, the spool and holder/crank may be inserted into the spindle assembly so that the spindle engages the hole in the first end of the spool and the rim engages the plurality of bearings. The cutter is then brought to bear against the filter medium, and the handle of the holder/crank rotated so that a circumferential cut is made in the filter medium.

In accordance with an important aspect of the invention, the spindle is longitudinally movable and lockable with respect to the plurality of bearings.

In accordance with an important feature of the invention, the spindle has a circular hole engaging portion which has a plurality of stagger-stepped diameters for receiving spool holes of different sizes.

In accordance with another important aspect of the invention, the spindle has a stop for aligning the spool with the spindle and the rim with the plurality of bearings.

In accordance with another important feature of the invention, the spindle assembly includes a guide rod. The cutter is rotatably connected to the guide rod, and can be longitudinally moved along the guide rod.

In accordance with another important aspect of the invention, the cutter has a selectively retractable hood which covers a cutting blade.

In accordance with another important feature of the invention, the spindle assembly has a downwardly projecting flange to accommodate installation in a conventional vice. Alternatively, the flange may be removed and the spindle assembly may be rigidly mounted on a work bench or table.

In accordance with another aspect of the invention, the holder/crank includes a pocket which is shaped and dimensioned to receive the second end of the spool.

Other features and advantages of the present invention will become apparent from the following detailed description, taken in conjunction with the accompanying drawings, which illustrate, by way of example, the principles of the invention.

DETAILED DESCRIPTION OF THE INVENTION

Figure 1:
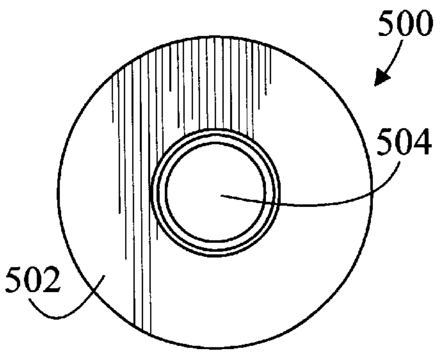
Fig. 1 PRIOR ART
FIG. 1 is a top plan view of a prior art spool of an oil filter.
Figure 2:
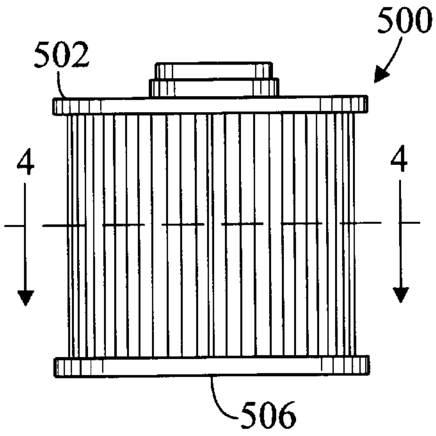
Fig. 2 PRIOR ART
FIG. 2 is a side elevation view of the spool showing the filter medium.
Figure 3:
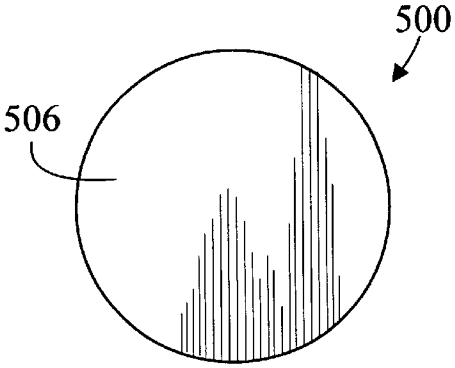
Fig. 3 PRIOR ART
FIG. 3 is a bottom plan view of the spool.
Figure 4:
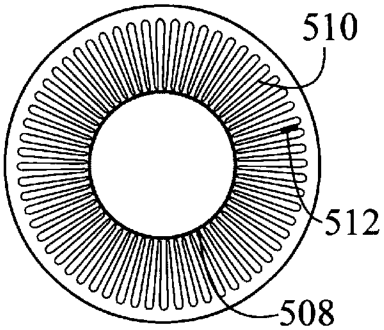
Fig. 4 PRIOR ART
FIG. 4 is a cross sectional view along the line 4—4 of FIG. 2.

Referring initially to FIGS. 1–4, there are illustrated top plan, side elevation, bottom plan, and cross sectional views respectively of a prior art oil filter spool, generally designated as 500. Oil filter spool 500 has a first end 502 having a central hole 504, an opposite closed second end 506, and a central hub 508. A pleated filter medium 510, such as heavy paper, is wrapped around hub 508 and glued to ends 502 and 506. A clip 512 (also refer to FIG. 16) is utilized to hold the two ends of filter medium 510 together.

Figure 5:
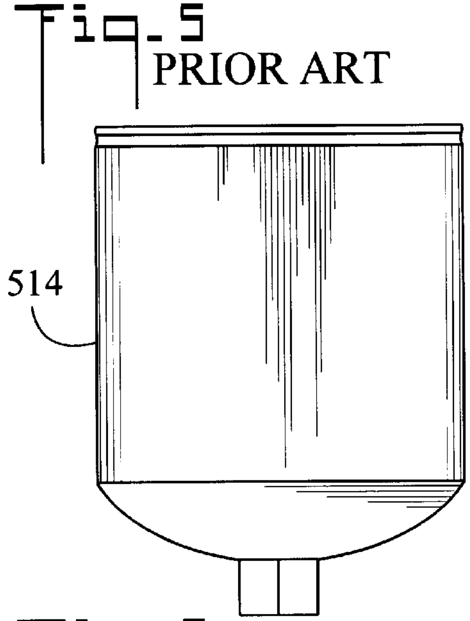
Fig. 5 PRIOR ART
FIG. 5 is a side elevation view of an oil filter canister in which the filter spool is disposed.
Figure 6:
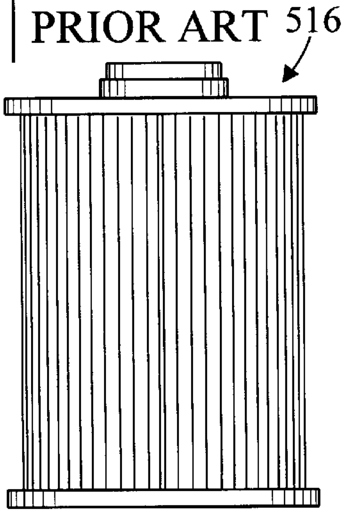
Fig. 6 PRIOR ART
FIG. 6 is a side elevation view of a second longer spool.

FIG. 5 is a side elevation view of an oil filter canister 514 in which filter spool 500 is disposed. And, FIG. 6 is a side elevation view of a second longer type of spool 516.

Figure 17:
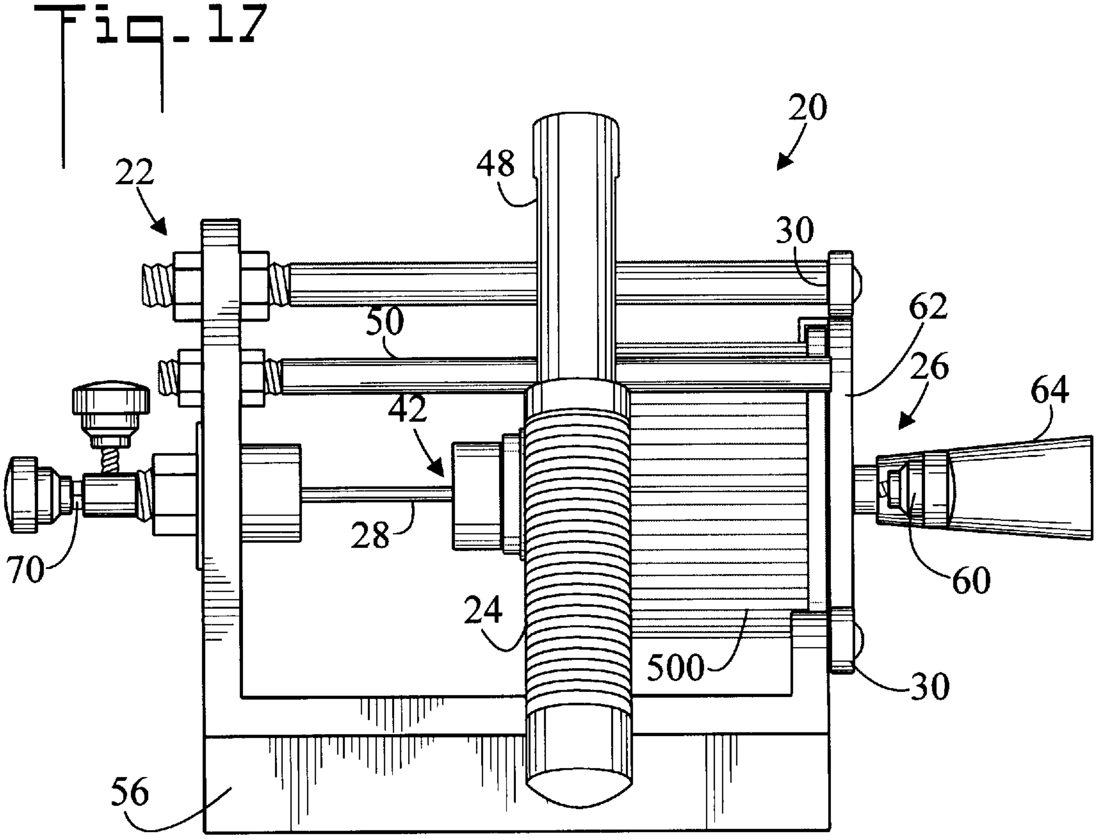
FIG. 17 is a front elevation view of a device for removing the filter medium from the spool of an oil filter in accordance with the present invention, generally designated as 20.

Referring to FIG. 17, there is illustrated a front elevation view of a device for removing the filter medium 510 from the spool 500 of an oil filter in accordance with the present invention, generally designated as 20. Device 20 includes a spindle assembly 22 having a cutter 24, and a holder/crank assembly 26.

Figure 7:
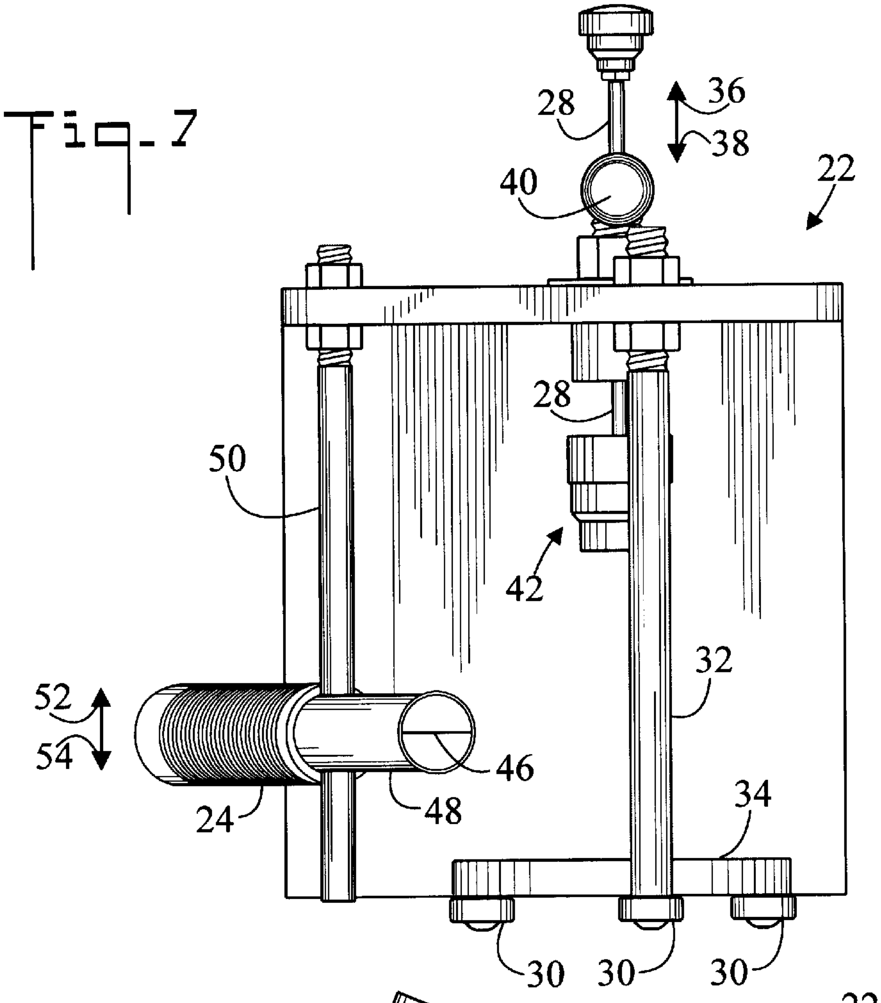
FIG. 7 is a top plan view of a spindle assembly.
Figure 8:
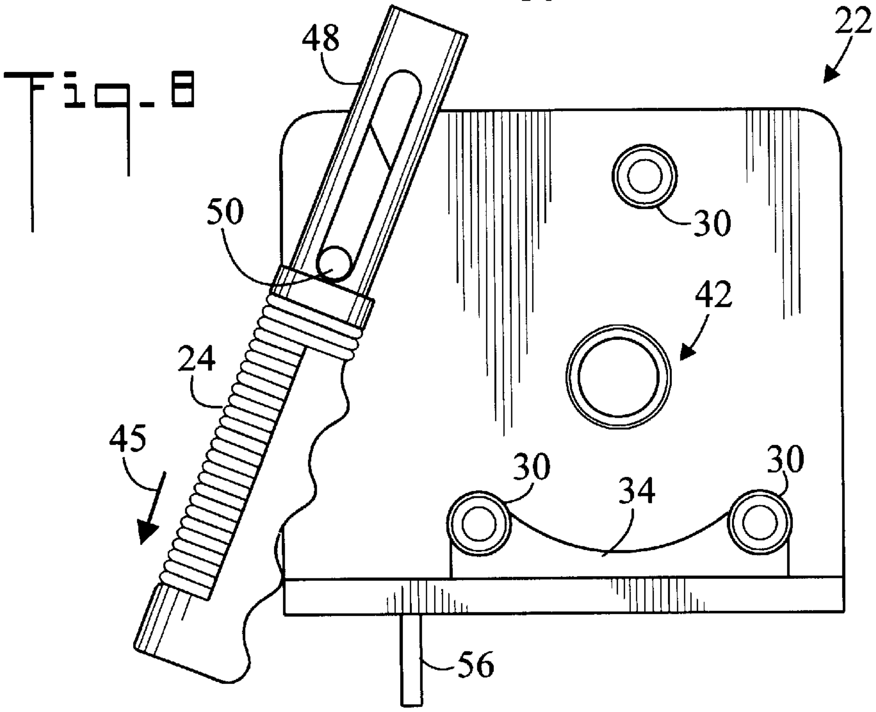
FIG. 8 is an end elevation view of the spindle assembly.
Figure 9:
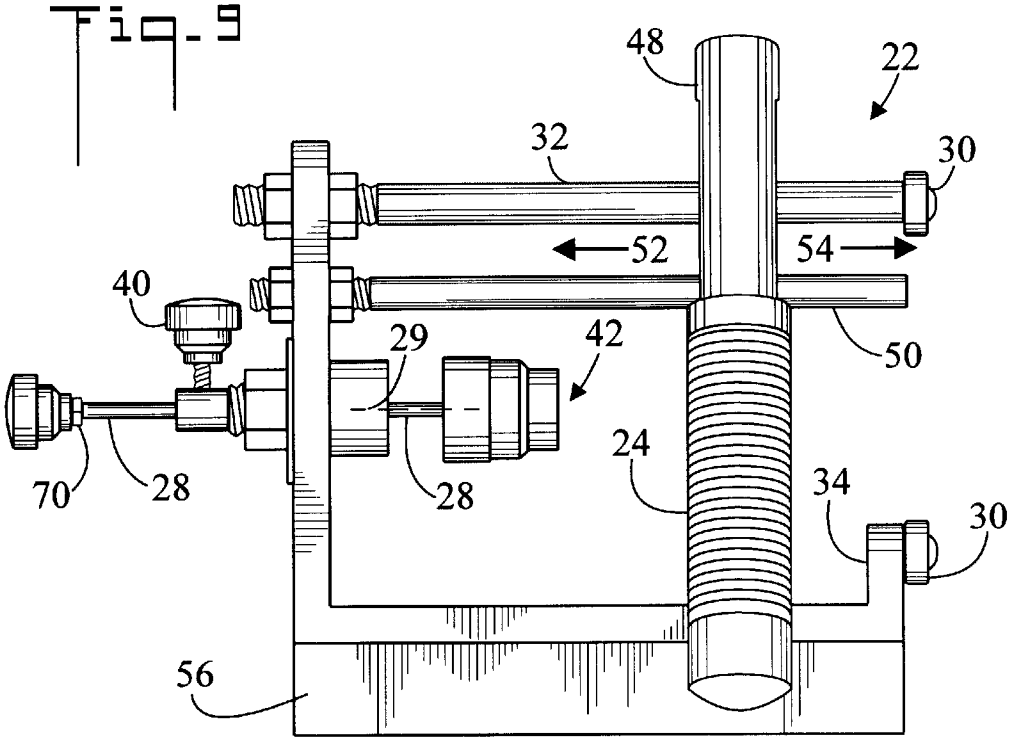
FIG. 9 is a front elevation view of the spindle assembly.
Figure 10:
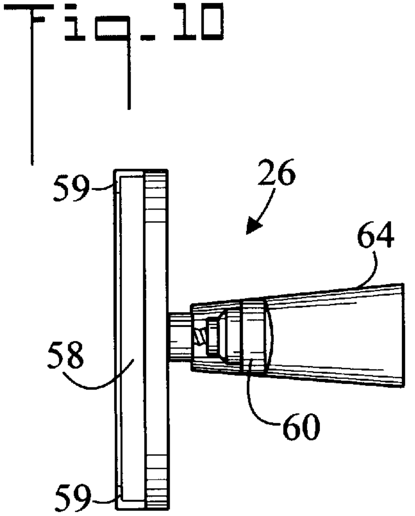
FIG. 10 is a front elevation view of a holder/crank.
Figure 11:
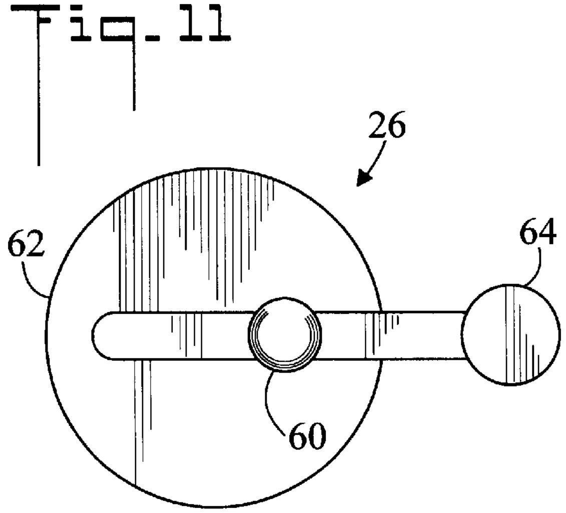
FIG. 11 is an end elevation view of the holder/crank.
Figure 12:
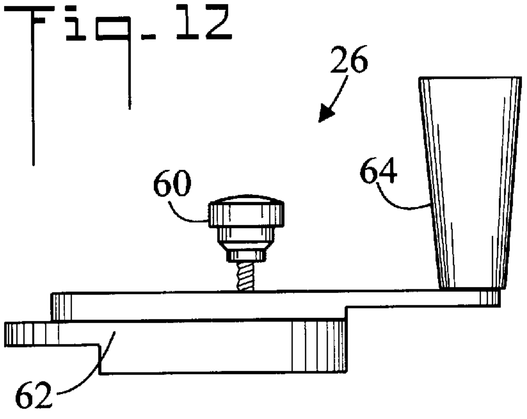
FIG. 12 is a top plan view of the holder/crank.
Figure 13:
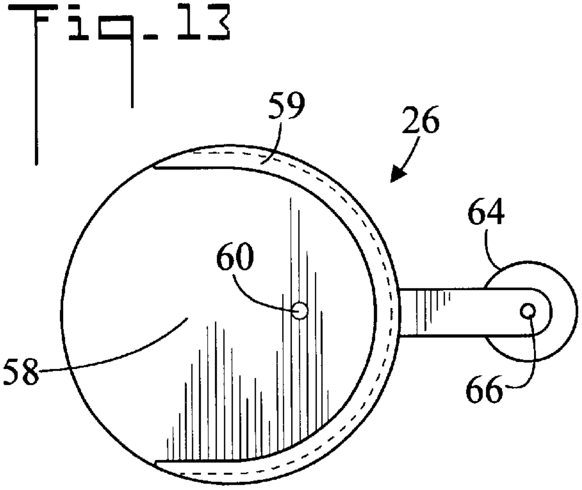
FIG. 13 is a bottom plan view of the holder/crank.

FIGS. 7–9 are top plan, end elevation, and front elevation views respectively of spindle assembly 22. Spindle assembly 22 includes a spindle 28 which is shaped and dimensioned to receive hole 504 in first end 502 of spool 500. Spindle 28 has a longitudinal axis 29. Spindle assembly 22 further includes a plurality of bearings 30, three in the shown preferred embodiment. One bearing 30 is mounted on a rod 32, and two bearings 30 are mounted on a bracket 34. Spindle 28 is longitudinally movable and lockable in directions 36 and 38 with respect to bearings 30. In a preferred embodiment, the locking mechanism is a knob-mounted screw 40 which can be selectively turned to abut spindle 28. Also, in the shown preferred embodiment, spindle 28 has a circular hole engaging portion 42 having a plurality of diameters for receiving spool holes 504 of different sizes. That is, hole engaging portion 42 includes several stagger-stepped portions, wherein one portion is able to enter hole 504 and the adjacent portion abuts hole 504.

Figure 18:
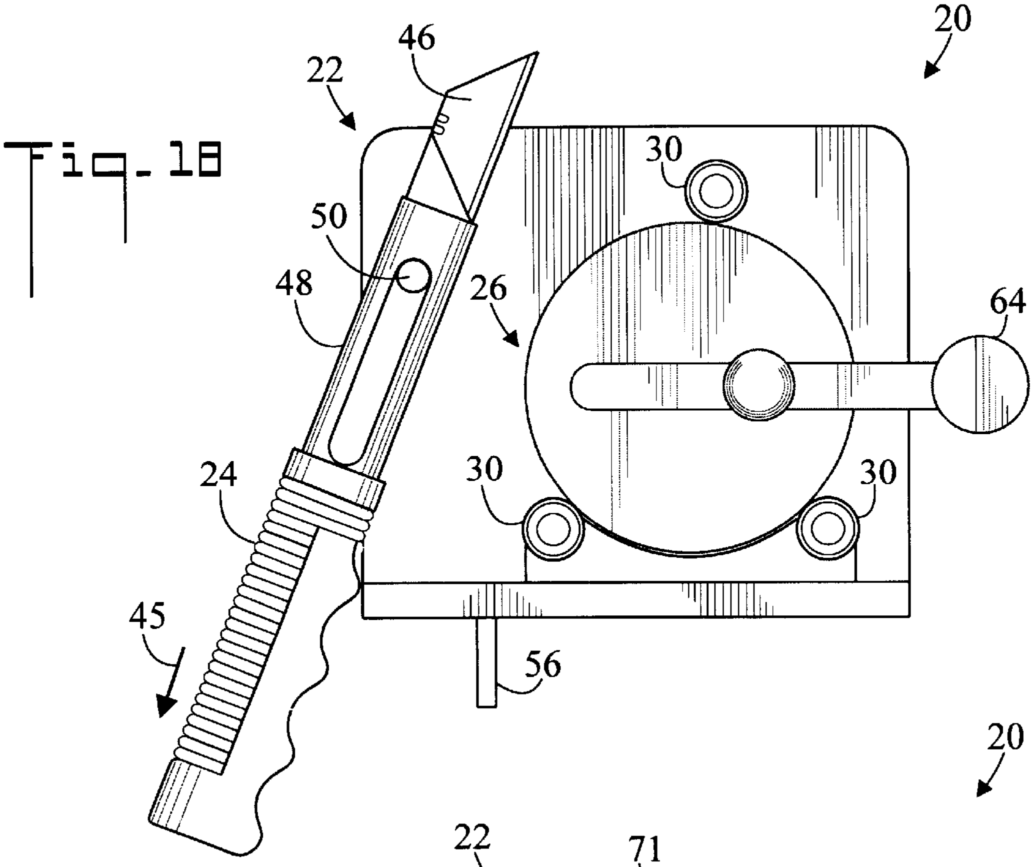
FIG. 18 is an end elevation view of the device showing a cutter.
Figure 19:
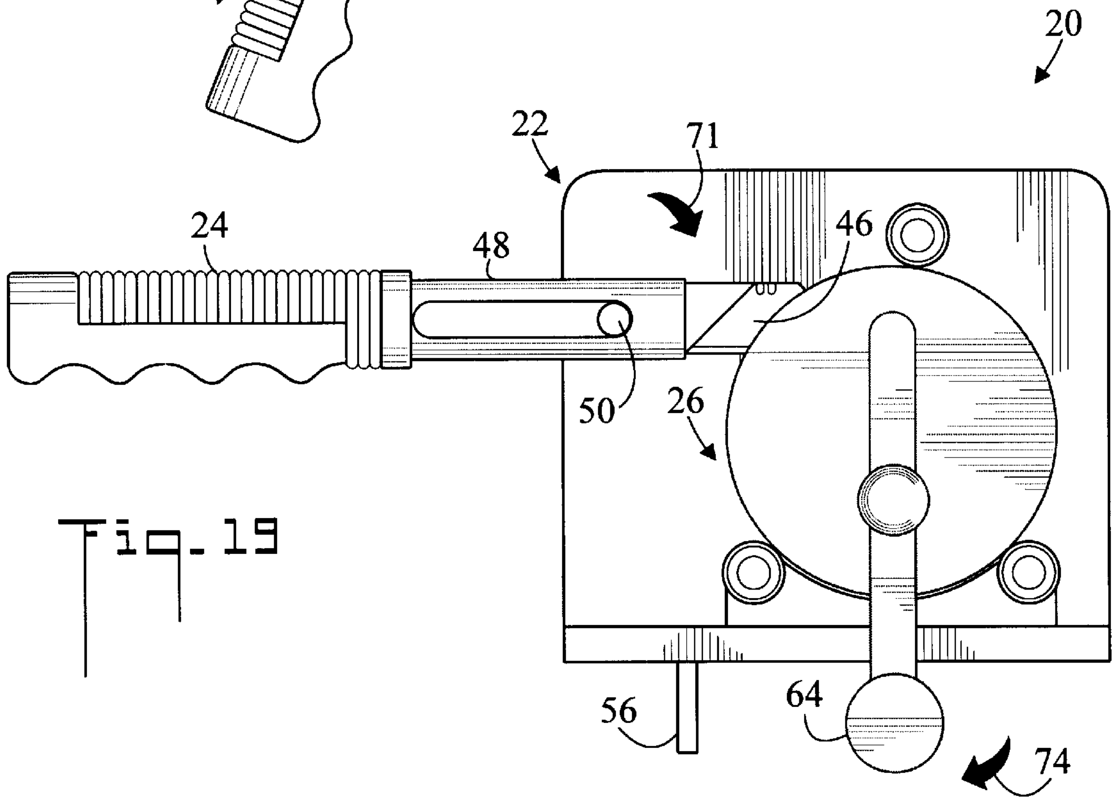
FIG. 19 is an end elevation view of the device showing the cutter rotated to a cutting position.

Spindle assembly 22 further includes a cutter 24 which has a blade 46 (also refer to FIGS. 18 and 19). A selectively retractable hood 48 covers blade 46. Hood 48 is biased (such as by spring loading) so as to cover blade 46. When blade 46 is to be used, hood 48 is moved in direction 45 (refer to FIG. 18) so as to expose blade 46. Spindle assembly 22 also includes a rod 50 to which cutter 24 is rotatably connected. Rod 50 is oriented parallel to spindle axis 29. Cutter 24 is also longitudinally movable in directions 52 and 54 along rod 50.

Spindle assembly 22 further includes a downwardly projecting flange 56 to accommodate installation in a conventional vice, thereby holding device 20 stationary while the filter medium 510 cutting operation takes place. Flange 56 is used to place device 20 in a conventional vice. Flange 56 is disposed toward the front of device 20 so that when device 20 is placed in the vice it will not interfere with the turning of the vice handle.

FIGS. 10–13 are front elevation, end elevation, top plan, and bottom plan views respectively of holder/crank assembly 26. Holder/crank 26 has a pocket 58 shaped and dimensioned to receive second end 506 of spool 500. Ridges 59 serve to retain spool 500 in place within pocket 58. A retainer 60 is provided for holding spool 500 in holder/crank 26, wherein second end 506 of spool 500 may be inserted into pocket 58 and held in place therein by retainer 60 (refer also to FIG. 15 and 16). In the shown preferred embodiment, retainer 60 includes a knob-mounted screw which may be selectively turned to abut second end 506 of spool 500.

Holder/crank 26 further includes a circular rim 62 for engaging bearings 30 of spindle assembly 22, and a handle 64 for rotating holder/crank 26 once it is installed in spindle assembly 22. Handle 64 rotates about a central axis 66.

Figure 14:
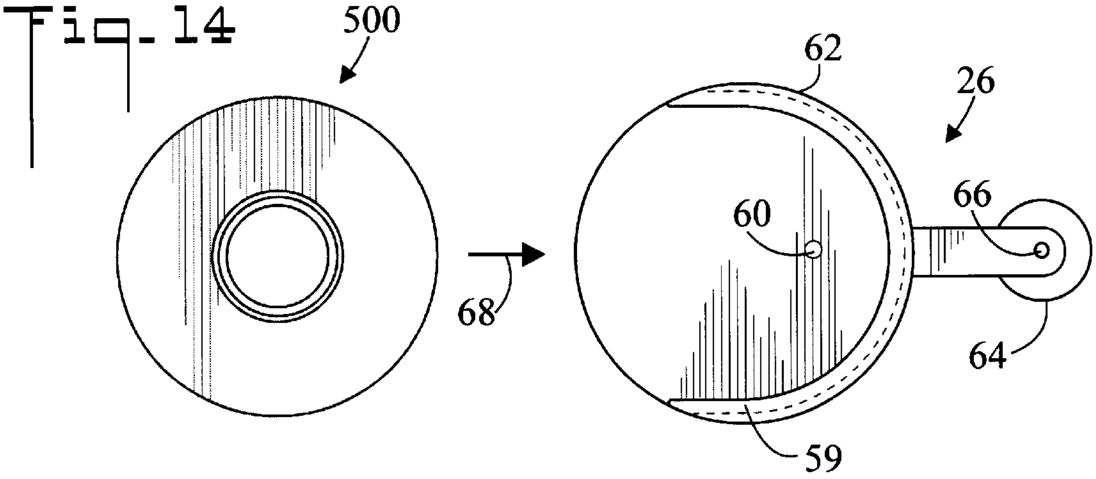
FIG. 14 is a view of the spool being inserted into the holder/crank.

FIG. 14 is a view of spool 500 being inserted into holder/crank 26 in direction 68.

Figure 15:
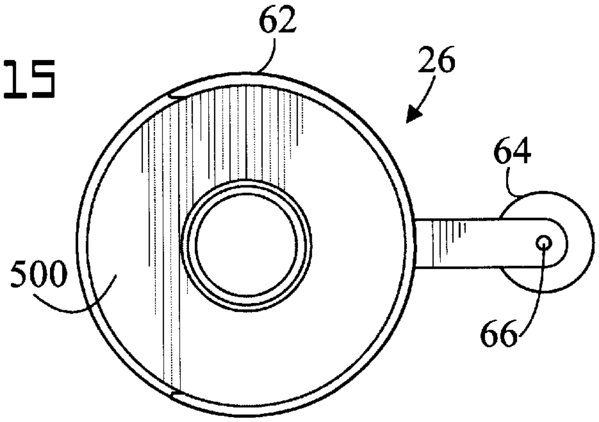
FIG. 15 is a view of the spool fully inserted into the holder/crank.

FIG. 15 is a view of spool 500 fully inserted into holder/crank 26. Once fully inserted, retainer 60 is screwed down to abut spool 500 and hold it firmly in place within holder/crank 26.

Figure 16:
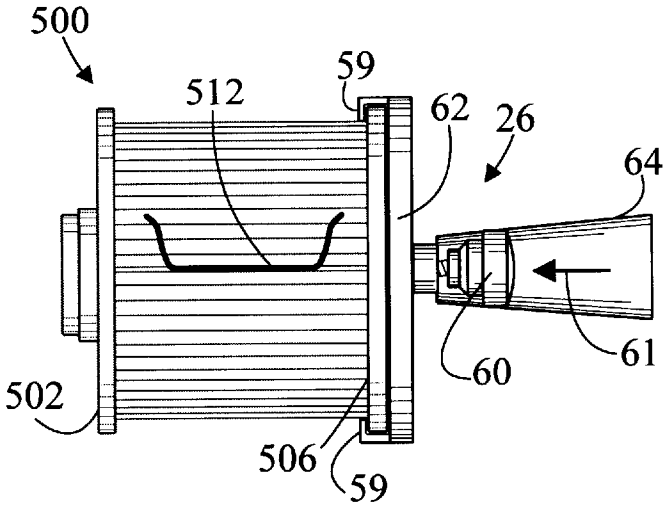
FIG. 16 is a front elevation view of the spool fully inserted into the holder/crank.

FIG. 16 is a front elevation view of spool 500 fully inserted into holder/crank 26. Retainer 60 has been screwed down onto second end 506 in direction 61. It is observed that both ends of clip 512 have been bent so as not to interfere with cutter 24 during the cutting operation.

Again referring to FIG. 17, there is illustrated a front elevation view of a device for removing the filter medium 510 from the spool 500 of an oil filter in accordance with the present invention, generally designated as 20. Spool 500 has been connected to holder/crank 26, and the spool 500 and holder/crank 26 inserted into spindle assembly 22 so that hole engaging portion 42 of spindle 28 engages hole 504 in the first end 502 of spool 500, and rim 62 engages plurality of bearings 30. Spindle 28 further includes a stop 70 for conveniently aligning spool 500 with spindle 28 and rim 62 with said plurality of bearings 30. That is, by adjusting the width of stop 70 to accommodate a standard spool 500 size, spindle 28 may be moved to its innermost position and rim 62 of holder/crank will align with bearings 30.

FIG. 18 is an end elevation view of device 20 showing cutter 24. Selectively retractable hood 48 has been moved in direction 45 to expose blade 46.

FIG. 19 is an end elevation view of device 20 showing the cutter 24 rotated in direction 71 about rod 50 to a cutting position. Blade 46 is brought to bear against filter medium 510. As holder/crank 26 is rotated by handle 64 in direction 74 causing spool 500 to rotate about spindle 28, blade 46 of cutter 24 is continuously pushed against filter medium 510 thereby making a circumferential cut in filter medium 510. The cutting and rotating operation continues until filter medium 510 has been cut all the way to central hub 508 (refer to FIG. 22).

Figure 20:
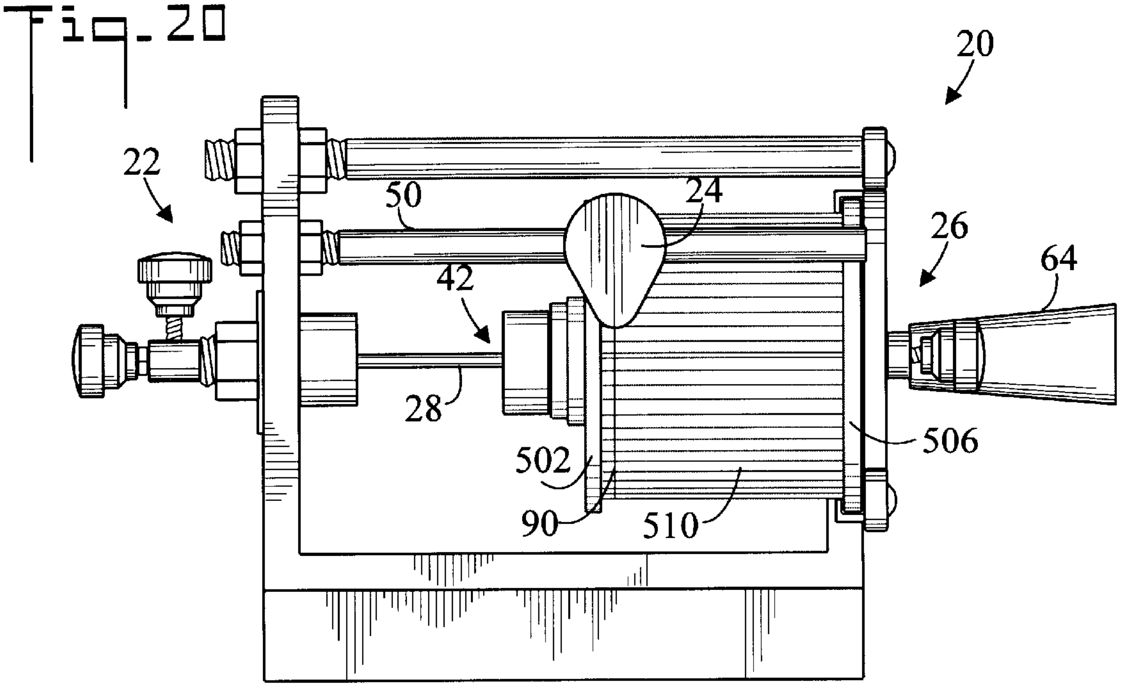
FIG. 20 is a front elevation view of the device with the cutter rotated to a cutting position.

FIG. 20 is a front elevation view of device 20 with cutter 24 rotated to a cutting position near first end 502 of spool 500. Cutter 24 has made cut 90 in filter medium 510.

Figure 21:
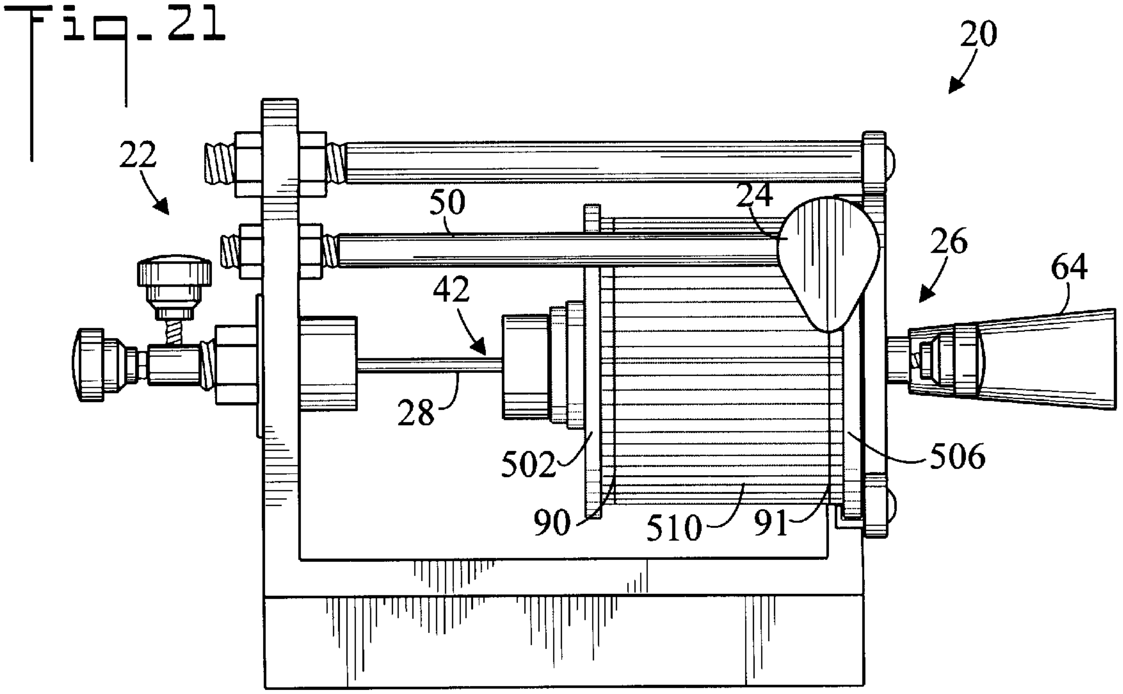
FIG. 21 is a front elevation view of the device with the cutter moved to second cutting position.

FIG. 21 is a front elevation view of device 20 with the cutter 24 moved along rod 50 to second cutting position near second end 506 of spool 500. Cutter 24 has made second cut 91 in filter medium 510.

Figure 22:
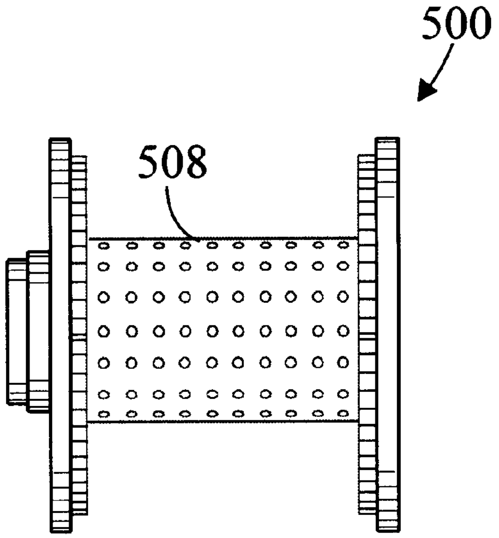
FIG. 22 is a side elevation view of the spool with the filter medium removed.

FIG. 22 is a side elevation view of spool 500 with the filter medium 510 removed to expose central hub 508.

Figure 23:
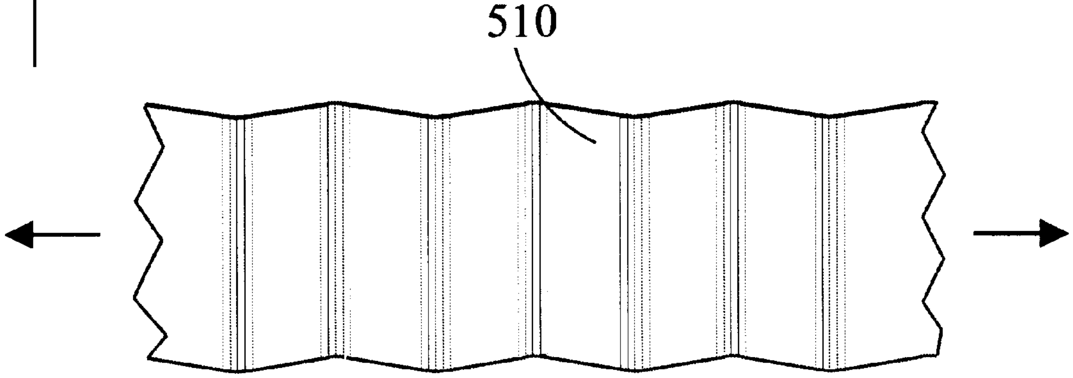
FIG. 23 is a fragmented top plan view of the filter medium longitudinally stretched out; and, FIG. 24 is a front elevation view of the device with the longer spool of FIG. 6 installed.

FIG. 23 is a fragmented top plan view of filter medium 510 longitudinally stretched out for the purposes of inspection.

Figure 24:
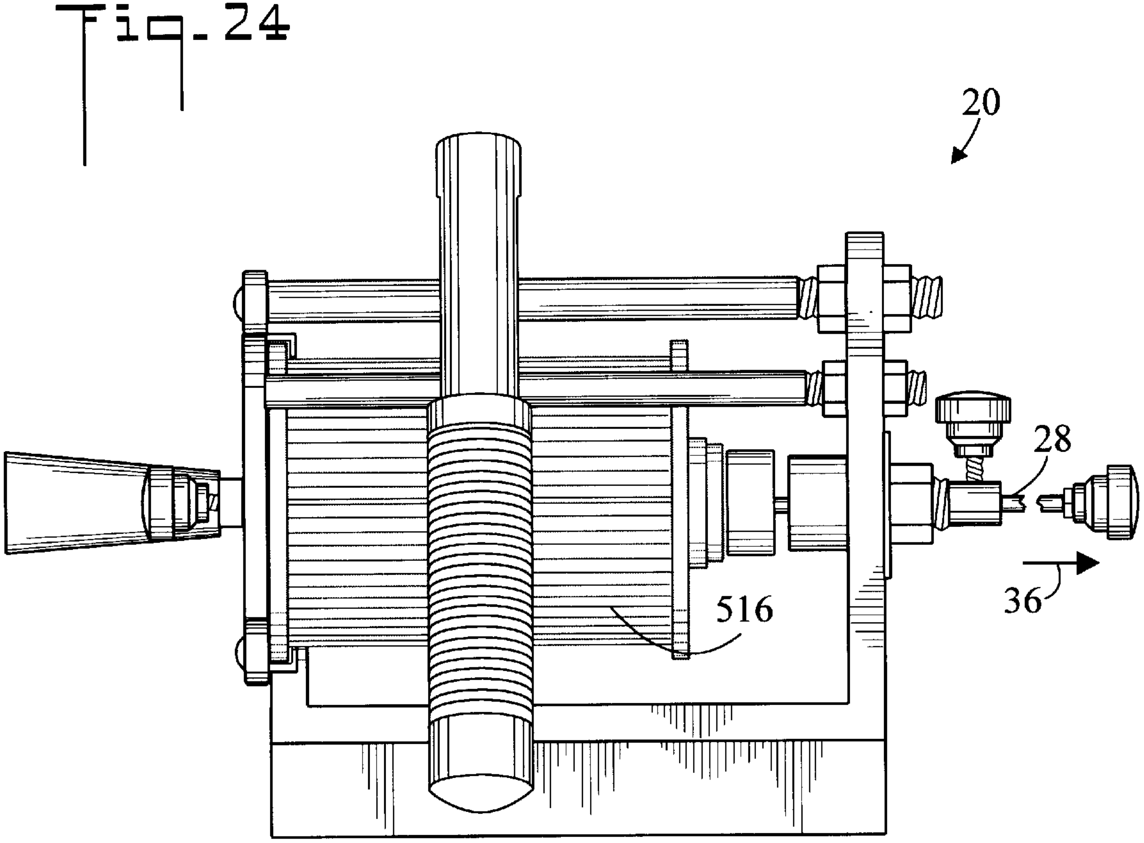

FIG. 24 is a front elevation view of device 20 with the longer spool 516 of FIG. 6 installed. To accommodate longer spool 516, spindle 28 has been moved outward in direction 36. Also, it is noted that device 20 may be constructed in a reverse form to accommodate left handed individuals.

In terms of use, a method for removing the filter medium 510 from the spool 500 of an oil filter comprises: (also refer to FIGS. 7–21)

(1) providing a spool 500 having:
  - a first end 502 having a hole 504;
  - an opposite closed second end 506; and,
  - filter medium 510 wherein the filter medium 510 is saturated with oil;

(2) providing a device 20 for removing the filter medium 510 from the spool 500 the device 20 including:
  - a spindle assembly 22 including:
    - a spindle 28 shaped and dimensioned to receive the hole 504 in first end 502 of spool 500;
    - a plurality of bearings 30; and,
    - a cutter 24;
  - a holder/crank 26 including:
    - said holder/crank shaped and dimensioned to receive second end 506 of spool 500;
    - a retainer 60 for holding spool 500 in holder/crank 26;
    - a circular rim 62; and,
    - a handle 64 for rotating holder/crank 26;

(3) inserting second end 506 of spool 500 into holder/crank 26;

(4) using retainer 60 to lock spool 500 in holder/crank 26;

(5) inserting spool 500 and holder/crank 26 into spindle assembly 22 so that spindle 28 engages hole 504 in first end 502 of spool 500 and rim 62 engages plurality of bearings 30;

(6) positioning cutter 24 on filter medium 510 near first end 502 of spool 500;

(7) bringing cutter 24 to bear against filter medium 510;

(8) while continuously pressing cutter 24 against filter medium 510, rotating holder/crank 26 so that a circumferential cut is made through filter medium 510;

(9) positioning cutter on filter medium 510 near second end 506 of spool 500;

(10) bringing cutter 24 to bear against filter medium 510;

(11) while continuously pressing cutter 24 against filter medium 510, rotating holder/crank 26 so that a second circumferential cut is made through filter medium 510; and,

(12) removing filter medium 510 from spool 500.

The method further including:

spindle 28 being longitudinally movable and lockable with respect to plurality of bearings 30; and, in step (5), longitudinally moving and locking spindle 28 so that rim 62 engages plurality of bearings 30 and spindle 28 engages hole 504 in spool 500.

The method further including:

filter medium 510 including a clip 512; and, prior to steps (7) and (10), bending clip 512 so as not to interfere with cutter 24.

The method further including:

cutter 24 further including a blade 46; and, cutter further including a selectively retractable hood 48 for covering blade 46; and, steps (7) and (10) further including retracting hood 48 so as to expose blade 46.

The method further including:

in steps (8) and (11), continuously pushing holder/crank 26 toward spindle 28.

The method further including:

providing a conventional vice;

spindle assembly 22 having a downwardly projecting flange 56; and, prior to steps (8) and (11), locking flange 56 in the conventional vice so that device 20 is stationary.

The preferred embodiments of the invention described herein are exemplary and numerous modifications, dimensional variations, and rearrangements can be readily envisioned to achieve an equivalent result, all of which are intended to be embraced within the scope of the appended claims.

I claim:

1. A device for removing the filter medium from the spool of an oil filter, the spool having a first end having a hole and an opposite second end, said device comprising:

a spindle assembly including:

a spindle shaped and dimensioned to receive the hole in the first end of the spool;

a plurality of bearings; and, a cutter;

a holder/crank including:

said holder/crank shaped and dimensioned to receive the second end of the spool;

a retainer for holding the spool in said holder/crank, wherein the second end of the spool is connectable to said holder/crank and held in place therein by said retainer;

a circular rim;

a handle for rotating said holder/crank; and, wherein with the spool connected to said holder/crank, the spool and said holder/crank are insertable into said spindle assembly so that said spindle engages the hole in the first end of the spool and said rim engages said plurality of bearings, said cutter brought to bear against the filter medium, and said holder/crank rotated so that a circumferential cut is made in the filter medium.

2. A device according to claim 1, further including:

said spindle longitudinally movable and lockable with respect to said plurality of bearings.

3. A device according to claim 1, further including:

said spindle having a circular hole engaging portion;

said hole engaging portion having a plurality of diameters for receiving spool holes of different sizes.

4. A device according to claim 1, further including:

said spindle having a stop for aligning the spool with the spindle and said rim with said plurality of bearings.

5. A device according to claim 1, further including:

said plurality of bearings including exactly three bearings.

6. A device according to claim 1, further including:

said spindle assembly including a rod;

said cutter rotatably connected to said rod; and, said cutter longitudinally movable along said rod.

7. A device according to claim 1, further including:

said cutter having a blade;

a selectively retractable hood covering said blade; and, said hood biased so as to cover said blade.

8. A device according to claim 1, further including:

said spindle assembly having a downwardly projecting flange to accommodate installation in a conventional vice.

9. A device according to claim 1, further including:

said retainer including a screw which is selectively turnable to abut the second end of the spool.

10. A device according to claim 1, further including:

said holder/crank including a pocket shaped and dimensioned to receive the second end of the spool.

11. A device according to claim 1, further including:

said spindle longitudinally movable and lockable with respect to said plurality of bearings;

said spindle having a circular hole engaging portion;

said hole engaging portion having a plurality of diameters for receiving spool holes of different sizes;

said spindle assembly including a rod;

said cutter rotatably connected to said rod;

said cutter longitudinally movable along said rod;

said cutter having a blade;

a selectively retractable hood covering said blade; and, said hood biased so as to cover said blade.

12. A method for removing the filter medium from the spool of an oil filter, comprising:

(1) providing said spool having:

a first end having a hole;

an opposite second end; and, said filter medium wherein said filter medium is saturated with oil;

(2) providing a device for removing said filter medium from said spool said device including:

a spindle assembly including:

a spindle shaped and dimensioned to receive said hole in said first end of said spool;

a plurality of bearings; and, a cutter;

a holder/crank including:

said holder/crank shaped and dimensioned to receive said second end of said spool;

a retainer for holding said spool in said holder/crank;

a circular rim; and, a handle for rotating said holder/crank;

(3) connecting said second end of said spool to said holder/crank;

(4) using said retainer to lock said spool in said holder/crank;

(5) inserting said spool and said holder/crank into said spindle assembly so that said spindle engages said hole in said first end of said spool and said rim engages said plurality of bearings;

(6) positioning said cutter on said filter medium near said first end of said spool;

(7) bringing said cutter to bear against said filter medium;

(8) while continuously pressing said cutter against said filter medium, rotating said holder/crank so that a circumferential cut is made through said filter medium;

(9) positioning said cutter on said filter medium near said second end of said spool;

(10) bringing said cutter to bear against said filter medium;

(11) while continuously pressing said cutter against said filter medium, rotating said holder/crank so that a second circumferential cut is made through said filter medium; and,

(12) removing said filter medium from said spool.

13. The method according to claim 12, further including:

said spindle longitudinally movable and lockable with respect to said plurality of bearings; and, in step (5), longitudinally moving and locking said spindle so that said rim engages said plurality of bearings and said spindle engages said hole in said spool.

14. The method according to claim 12, further including:

said filter medium including a clip; and, prior to steps (7) and (10), bending said clip so as not to interfere with said cutter.

15. The method according to claim 12, further including:

said cutter further including a blade; and, said cutter further including a selectively retractable hood for covering said blade; and, steps (7) and (10) further including retracting said hood so as to expose said blade.

16. The method according to claim 12, further including:

providing a conventional vice;

said spindle assembly having a downwardly projecting flange; and, prior to steps (8) and (11), locking said flange in said conventional vice so that said device is stationary.

* * * * *